United States Patent
Karube et al.

(10) Patent No.: US 8,986,802 B2
(45) Date of Patent: Mar. 24, 2015

(54) WATER-PROOF SOUND-TRANSMITTING MEMBER AND METHOD FOR PRODUCING SAME, AND SUPPORTED WATER-PROOF SOUND-TRANSMITTING MEMBER

(75) Inventors: Yuki Karube, Osaka (JP); Yuichi Abe, Osaka (JP); Yuri Horie, Osaka (JP)

(73) Assignee: Nitto Denko Corporation, Osaka (JP)

( * ) Notice: Subject to any disclaimer, the term of this patent is extended or adjusted under 35 U.S.C. 154(b) by 133 days.

(21) Appl. No.: 13/818,256

(22) PCT Filed: Apr. 2, 2012

(86) PCT No.: PCT/JP2012/002263
§ 371 (c)(1),
(2), (4) Date: Feb. 21, 2013

(87) PCT Pub. No.: WO2012/164799
PCT Pub. Date: Dec. 6, 2012

(65) Prior Publication Data
US 2013/0156985 A1    Jun. 20, 2013

(30) Foreign Application Priority Data
Jun. 1, 2011    (JP) .................................. 2011-123183

(51) Int. Cl.
*B32B 9/00*    (2006.01)
*B32B 33/00*    (2006.01)
*B32B 7/06*    (2006.01)
(Continued)

(52) U.S. Cl.
CPC ............... *B32B 7/06* (2013.01); *Y10T 428/149* (2013.01); *Y10T 428/1476* (2013.01); *H04R 1/086* (2013.01); *H04R 1/44* (2013.01); *H04R 31/00* (2013.01)
USPC ......................................... 428/40.1; 428/343

(58) Field of Classification Search
CPC .......... B32B 27/06; B32B 27/08; B32B 7/06; C08J 5/2237; B28K 2027/18; B28K 2105/256; B28K 2995/0001; B28K 2995/0069; C09J 2201/128; C09J 7/0296; H04R 1/086; H04R 1/44; H04R 31/00
USPC ................................................. 428/40.1, 343
See application file for complete search history.

(56) References Cited

U.S. PATENT DOCUMENTS

| 5,178,293 A | 1/1993 | Suzuki et al. |
| 8,695,812 B2 * | 4/2014 | Horie et al. ............... 210/500.36 |

(Continued)

FOREIGN PATENT DOCUMENTS

| EP | 0 282 773 | 9/1988 |
| EP | 1 255 252 | 11/2002 |

(Continued)

*Primary Examiner* — Patricia L Nordmeyer
(74) *Attorney, Agent, or Firm* — Hamre, Schumann, Mueller & Larson, P.C.

(57) ABSTRACT

A water-proof sound-transmitting member that can be separated reliably from a releasing paper when an overhanging portion of a tab is pulled can be produced by producing a laminate by laminating a first layer, a preliminary membrane body, a second layer, and a preliminary tab body in this order; inserting a blade into the laminate from the first layer side to cut the first layer, the preliminary membrane body and the second layer so as to form the water-proof sound-transmitting membrane between adhesive layers, and providing, in a surface of the preliminary tab body on a side of the second layer, a notch, followed by cutting the preliminary tab body to form the tab.

6 Claims, 5 Drawing Sheets

(51) Int. Cl.
*H04R 31/00* (2006.01)
*H04R 1/08* (2006.01)
*H04R 1/44* (2006.01)

(56) References Cited

U.S. PATENT DOCUMENTS

2010/0206660 A1 8/2010 Horie et al.
2010/0247857 A1 9/2010 Sanami et al.
2011/0117304 A1 5/2011 Ueki et al.

FOREIGN PATENT DOCUMENTS

| | | |
|---|---|---|
| JP | 2008-245332 | 10/2008 |
| JP | 2009-111993 | 5/2009 |
| JP | 2010-004397 | 1/2010 |
| WO | 01/03468 | 1/2001 |
| WO | 2009/011315 | 1/2009 |

* cited by examiner

WATER-PROOF SOUND-TRANSMITTING MEMBER AND METHOD FOR PRODUCING SAME, AND SUPPORTED WATER-PROOF SOUND-TRANSMITTING MEMBER

TECHNICAL FIELD

The present invention relates to a water-proof sound-transmitting member in which a tab is adhered to a water-proof sound-transmitting membrane for a housing of an electronic apparatus having a sound device such as a speaker and a microphone, and a method for producing the water-proof sound-transmitting member. The present invention also relates to a supported water-proof sound-transmitting member in which a releasing paper is adhered to the water-proof sound-transmitting member.

BACKGROUND ART

In electronic apparatuses such as a cellular phone, a cordless phone, and a digital camera, a sound device is accommodated in a housing. The housing has an opening for allowing sound to transmit therethrough. In order to prevent water from entering into the housing through this opening, a water-proof sound-transmitting membrane that blocks water from passing through the opening while allowing sound to transmit through the opening is disposed at the opening. For example, Patent Literature 1 discloses a protective cover assembly including such a water-proof sound-transmitting membrane.

Electronic apparatuses, such as a cellular phone, provided in recent years have been smaller in size and thickness than conventional electronic apparatuses. Accordingly, a water-proof sound-transmitting membrane to be attached to the housing of an electronic apparatus also has been smaller in size. Thus, when a water-proof sound-transmitting membrane is attached to a housing of an electronic apparatus provided in recent years, it is necessary to attach the water-proof sound-transmitting membrane to a specified position precisely. This makes it difficult to attach the water-proof sound-transmitting membrane to the housing.

In Patent Literature 2, in order to make it easy to attach the water-proof sound-transmitting membrane to the housing, a tab that can be separated after the water-proof sound-transmitting membrane is attached to the housing is provided to the water-proof sound-transmitting membrane. This tab has an overhanging portion overhanging beyond the water-proof sound-transmitting membrane. The overhanging portion thus formed is easy to hold. Accordingly, the water-proof sound-transmitting membrane with the tab adhered thereto disclosed in Patent Literature 2 can be attached to the housing easily. Moreover, use of such a tab makes it unnecessary to contact directly the water-proof sound-transmitting membrane at the time of attaching the water-proof sound-transmitting membrane to the housing, thereby reducing the possibility of damaging the water-proof sound-transmitting membrane.

Patent Literature 2 also describes a supported water-proof sound-transmitting member in which the water-proof sound-transmitting membrane with the tab adhered thereto (water-proof sound-transmitting member) is supported on a releasing paper. When the water-proof sound-transmitting membrane in this supported water-proof sound-transmitting member is attached to the housing, the overhanging portion of the tab in the supported water-proof sound-transmitting member firstly is pulled in a direction opposite to the releasing paper so that the water-proof sound-transmitting membrane is separated from the releasing paper. Next, the water-proof sound-transmitting membrane is attached to the housing. Finally, the overhanging portion of the tab is pulled in a direction opposite to the housing so that the tab is separated from the water-proof sound-transmitting membrane.

CITATION LIST

Patent Literature

PTL 1: JP 2008-245332 A
PTL 2: JP 2009-111993 A

SUMMARY OF INVENTION

Technical Problem

When an overhanging portion of a tab in a supported water-proof sound-transmitting member as mentioned above is pulled, it is desired that the water-proof sound-transmitting membrane can be separated reliably from the releasing paper. The present invention is intended to provide a method for producing a water-proof sound-transmitting member suitable for such a supported water-proof sound-transmitting member.

Solution to Problem

To produce a supported water-proof sound-transmitting member as mentioned above, it can be considered to carry out the following from the viewpoint of productivity. First, the materials of the components of the supported water-proof sound-transmitting member other than the tab are laminated in the above-mentioned order on the releasing paper to produce a laminate. Next, the components of the laminate other than the releasing paper are punched from a side opposite to the releasing paper toward the releasing paper, and finally the tab is adhered to the laminate. However, in the study by the present inventors, when the overhanging portion of the tab in the supported water-proof sound-transmitting member thus produced is pulled, the water-proof sound-transmitting membrane fails to be separated from the releasing paper but the tab is separated from the water-proof sound-transmitting membrane in some cases.

The present inventors have found that the bonding strength on the tab side is enhanced by allowing the above-mentioned laminate to include the material of the tab, and punching the laminate toward the tab, which is a direction opposite to that in the above-mentioned method. The present invention has been accomplished from this viewpoint.

That is, the present invention provides a method for producing a water-proof sound-transmitting member including a water-proof sound-transmitting membrane to be attached to a housing having a hole that allows sound to pass through the hole, and a tab that is provided to the water-proof sound-transmitting membrane and is to be separated after the water-proof sound-transmitting membrane is attached to the housing and that has an overhanging portion overhanging beyond the water-proof sound-transmitting membrane, the method comprising the steps of: producing a laminate by laminating a first layer including a first adhesive layer for bonding the water-proof sound-transmitting membrane to the housing, a preliminary membrane body including the water-proof sound-transmitting membrane, a second layer including a second adhesive layer for adhering the tab to the water-proof sound-transmitting membrane, and a preliminary tab body including the tab in this order; inserting a blade into the laminate from the first layer toward the preliminary tab body to cut the first layer, the preliminary membrane body and the second layer so as to form respectively the first adhesive layer, the water-proof sound-transmitting membrane and the second adhesive layer, and providing, in a surface of the preliminary tab body on a side of the second layer, a notch that is aligned with end faces of the first adhesive layer, the water-proof sound-transmitting membrane and the second adhesive layer; and cutting the preliminary tab body to form the tab.

The present invention also provides a water-proof sound-transmitting member comprising: a water-proof sound-transmitting membrane to be attached to a housing having a hole that allows sound to pass through the hole; a first adhesive layer for bonding the water-proof sound-transmitting membrane to the housing, the first adhesive layer being provided to a side of one surface of the water-proof sound-transmitting membrane; a second adhesive layer provided to a side of the other surface of the water-proof sound-transmitting membrane; and a tab that is provided on the second adhesive layer and is to be separated after the water-proof sound-transmitting membrane is attached to the housing and that has an overhanging portion overhanging beyond the water-proof sound-transmitting membrane. A notch that is aligned with end faces of the first adhesive layer, the water-proof sound-transmitting membrane and the second adhesive layer is formed on a surface of the tab on a side of the second adhesive layer so as to demarcate the overhanging portion.

Advantageous Effects of Invention

According to the production method of the present invention, the bonding strength between the tab and the water-proof sound-transmitting membrane is enhanced. Therefore, in the case where the water-proof sound-transmitting member produced by the production method of the present invention is supported on the releasing paper, the water-proof sound-transmitting member can be separated reliably from the releasing paper when the overhanging portion of the tab is pulled.

Moreover, for the above-mentioned reason, the water-proof sound-transmitting member of the present invention is suitable to be supported on a releasing paper.

DESCRIPTION OF EMBODIMENTS

Hereinafter, an embodiment of the present invention is described with reference to the accompanying drawings.

Figure 1:
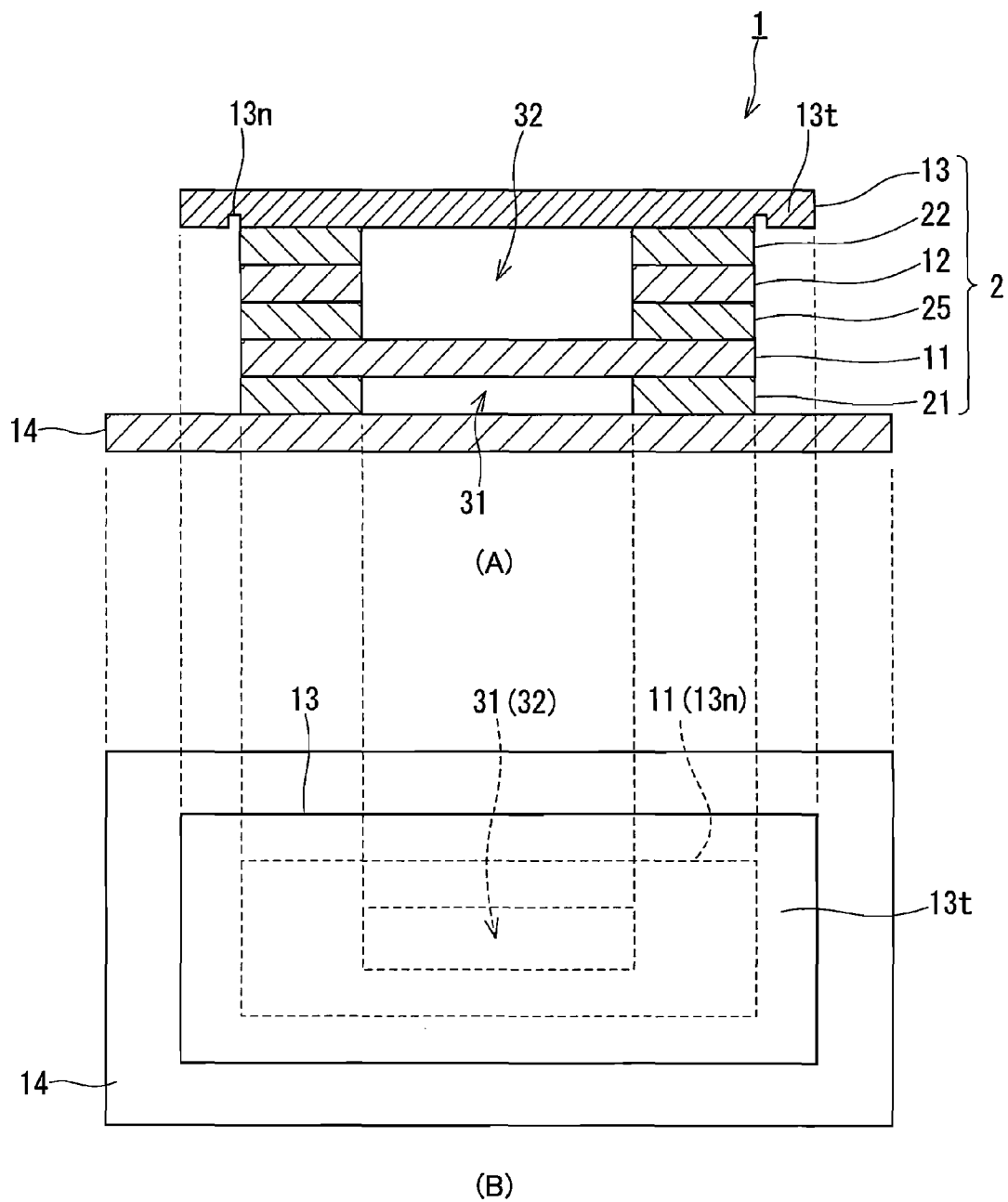
FIG. 1 shows an example of a supported water-proof sound-transmitting member including a water-proof sound-transmitting member produced by a production method according to one embodiment of the present invention. (A) is a cross-sectional view on a cross section parallel to the thickness direction of a water-proof sound-transmitting membrane. (B) is a top view observed from the tab side.

FIG. 1 (A) is a cross sectional view that shows an example of a supported water-proof sound-transmitting member including a water-proof sound-transmitting member produced by a production method according to one embodiment of the present invention. FIG. 1 (B) is a top view of the supported water-proof sound-transmitting member. A supported water-proof sound-transmitting member 1 shown in FIG. 1 includes a water-proof sound-transmitting member 2 and a releasing paper 14, and a first space 31 and a second space 32 are formed therein.

The water-proof sound-transmitting member 2 is adhered to the releasing paper 14, on one surface of a first adhesive layer 21. Although one water-proof sound-transmitting member 2 is provided for one piece of releasing paper 14 in the present embodiment, the releasing paper 14 may be shared by multiple water-proof sound-transmitting members 2.

The water-proof sound-transmitting member 2 includes a water-proof sound-transmitting membrane 11, a support layer 12, and a tab 13. The support layer 12 is bonded to the water-proof sound-transmitting membrane 11 via an intermediate adhesive layer 25. The tab 13 is adhered to the support layer 12 via a second adhesive layer 22. In the present embodiment, as shown in FIG. 1 (B), when viewed from the thickness direction of the water-proof sound-transmitting membrane 11, the water-proof sound-transmitting membrane 11 and the support layer 12 have the same rectangular outer contour, and the tab 13 has a larger rectangular outer contour than that. However, the water-proof sound-transmitting membrane 11, the support layer 12 and the tab 13 each may have an outer contour of another shape such as a circular shape.

The water-proof sound-transmitting membrane 11 is a membrane that blocks passage of foreign matters, such as a liquid and dust, while allowing passage of sound.

As the raw material of the water-proof sound-transmitting membrane 11, a polymer material can be mentioned. As a polymer material suitable for composing the water-proof sound-transmitting membrane 11, there can be mentioned polyethylene (PE), polyimide (PI), polypropylene (PP), polyethylene terephthalate (PET), and polytetrafluoroethylene (PTFE). Preferably, the water-proof sound-transmitting membrane 11 contains fluorine (preferably, the water-proof sound-transmitting membrane 11 is composed of a fluororesin). Polytetrafluoroethylene is particularly suitable as the raw material composing the water-proof sound-transmitting membrane 11. In the present embodiment, the water-proof sound-transmitting membrane 11 is a film-like membrane. Moreover, the water-proof sound-transmitting membrane 11 may be a nonwoven fabric, or may be formed by gathering nanofibers. Furthermore, the water-proof sound-transmitting membrane 11 may be treated with a water-repellent treatment.

The support layer 12 is bonded to the water-proof sound-transmitting membrane 11 to increase the rigidity of the water-proof sound-transmitting member 2. That is, the support layer 12 has the effect of stabilizing the shape of the water-proof sound-transmitting member 2. In the present embodiment, the support layer 12 is formed in a frame shape. The thickness of the support layer 12 can be adjusted as appropriate in accordance with the dimensions of a housing to which the water-proof sound-transmitting member 2 is to be attached or the like.

As the raw material of the support layer 12, there can be mentioned a polymer material such as polyethylene (PE), polyimide (PI), polypropylene (PP), and polyethylene terephthalate (PET). Also, a foamed polymer material (such as PORON) having a cushioning property can be used suitably as the raw material of the support layer 12. In the present embodiment, the support layer 12 is a film-like layer.

Although the support layer 12 is bonded to the water-proof sound-transmitting membrane 11 via the intermediate adhesive layer 25 in FIG. 1, the support layer 12 may be bonded directly to the water-proof sound-transmitting membrane 11. For example, by adopting thermal lamination as the bonding technique, it is possible to bond the support layer 12 directly to the water-proof sound-transmitting membrane 11. Moreover, although the support layer 12 is provided to the tab 13 side when viewed from the water-proof sound-transmitting membrane 11 in the present embodiment, the support layer 12 may be provided on the side opposite to the tab 13 when viewed from the water-proof sound-transmitting membrane 11. The support layer 12 may be omitted depending on the rigidity and other properties required for the water-proof sound-transmitting member 2.

The tab 13 serves as a holding margin used at the time of handling the water-proof sound-transmitting member 2. After the water-proof sound-transmitting membrane 11 is attached to an external housing, the tab 13 is separated from the water-proof sound-transmitting membrane 11 (from the support layer 12, to be more exact). The tab 13 is provided above the water-proof sound-transmitting membrane 11 so as to have an overhanging portion 13t overhanging beyond the water-proof sound-transmitting membrane 11. A notch 13n is formed in a surface of the tab 13 on the second adhesive layer 22 side so as to demarcate the overhanging portion 13t. In other words, the notch 13n extends along the boundary between the portion of the tab 13 other than the overhanging portion 13t and the overhanging portion 13t.

Figure 2:
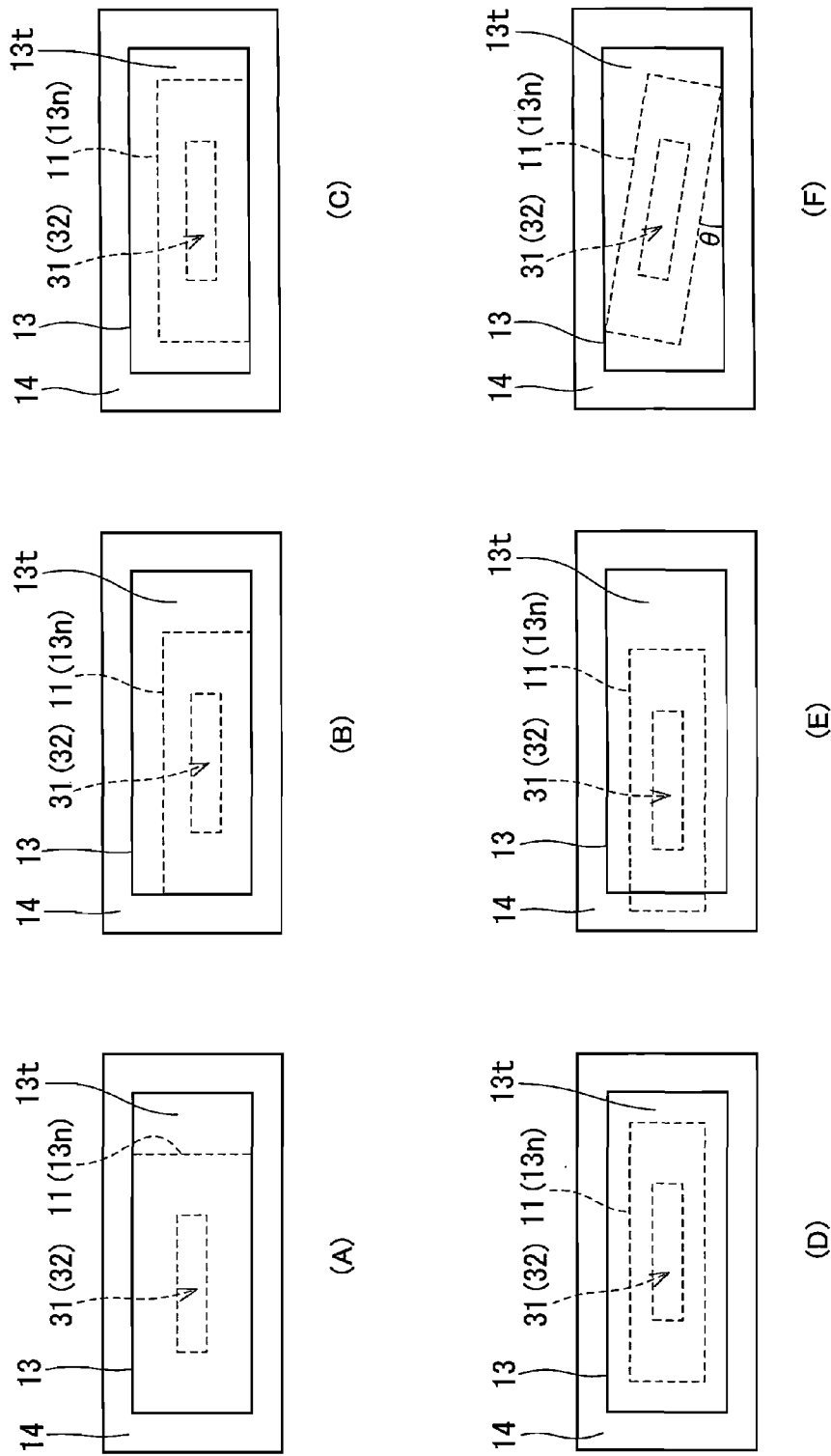
FIG. 2 is a diagram for explaining the positional relationship between a tab and the water-proof sound-transmitting membrane. (A) to (F) each show an example of the positional relationship.

The positional relationship between the tab 13 and the water-proof sound-transmitting membrane 11 is described in further detail with reference to FIG. 2. FIG. 2 shows top views of the supported water-proof sound-transmitting member 1 when viewed from the tab 13 side. The tab 13 may be provided above the water-proof sound-transmitting membrane 11 so that the overhanging portion 13t is formed in one side of the tab 13 (FIG. 2 (A)). Or the tab 13 may be provided above the water-proof sound-transmitting membrane 11 so that the overhanging portion 13t is formed in two sides of the tab 13 (FIG. 2 (B)). Or the tab 13 may be provided above the water-proof sound-transmitting membrane 11 so that the overhanging portion 13t is formed in three sides of the tab 13 (FIG. 2 (C)). Or the tab 13 may be provided above the water-proof sound-transmitting membrane 11 so that the overhanging portion 13t is formed in four sides (around the circumference) of the tab 13 (so that the overhanging portion 13t has the shape of a frame surrounding the water-proof sound-transmitting membrane 11) (FIG. 2 (D)). Or the tab 13 may be provided above the water-proof sound-transmitting membrane 11 so as to cover a part of the water-proof sound-transmitting membrane 11 (so that a part of the water-proof sound-transmitting membrane 11 projects beyond the tab 13) (FIG. 2 (E)). Although the sides of the tab 13 are parallel to the respective sides of the water-proof sound-transmitting membrane 11 in FIG. 2 (A) to FIG. 2 (E), the tab 13 may be provided above the water-proof sound-transmitting membrane 11 so that each side of the tab 13 forms a specified angle θ (0°<θ<90°) with the corresponding side of the water-proof sound-transmitting membrane 11 (FIG. 2 (F)). The overhanging portion 13t of the tab 13 may have an annular shape surrounding the water-proof sound-transmitting membrane 11, depending on the shapes of the tab 13 and the water-proof sound-transmitting membrane 11. From the viewpoint of the ease of production, it is preferable that the tab 13 is provided as shown in FIG. 2 (A). When the tab 13 is provided as shown in FIG. 2 (A) to FIG. 2 (D), the bonding strength between the tab 13 and the water-proof sound-transmitting membrane 11 is ensured, resulting in easy handling.

The notch 13n is formed so as to be aligned with end faces of the first adhesive layer 21, the water-proof sound-transmitting membrane 11, the intermediate adhesive layer 25, the support layer 12, and the second adhesive layer 22. Moreover, the notch 13n has a V shape (that may be a symmetrical V shape, or a V shape inclined toward the central side or peripheral side of the tab 13) on a cross section parallel to the thickness direction of the water-proof sound-transmitting membrane 11, for example. Furthermore, when viewed from the thickness direction of the water-proof sound-transmitting membrane 11, the notch 13n may have a linear shape (FIG. 2 (A)), an L shape (FIG. 2 (B)), a one-side-opened rectangular shape (FIGS. 2 (C) and (E)), or a hollow rectangular shape (FIGS. 2 (D) and (F)). In the present embodiment, both surfaces of the tab 13 are flat except for the portion in which the notch 13n is formed.

As the raw material of the tab 13, a polymer material and metal can be mentioned. As polymer materials suitable for composing the tab 13, there can be mentioned polyethylene (PE), polyimide (PI), polypropylene (PP), polyethylene terephthalate (PET), and polytetrafluoroethylene (PTFE). A foamed polymer material having a cushioning property also can be used as the raw material of the tab 13. In the present embodiment, the tab 13 is a film-like tab. However, the tab 13 may be a nonwoven fabric, or may be formed by gathering nanofibers. The tab 13 may be treated with a water-repellent treatment.

Preferably, the surface of the tab 13 on the second adhesive layer 22 side is treated with a releasing treatment so that the tab 13 is separated smoothly from the water-proof sound-transmitting membrane 11 after the water-proof sound-transmitting member 2 is attached to a housing. The releasing treatment is a treatment to coat something with a polymer (mold release agent) that has a low wettability to an adhesive. Examples of the polymer used for the releasing treatment include a silicone polymer. Examples of the coating technique include application.

Preferably, the tab 13 has a thickness of 0.001 mm to 1 mm. Preferably, the notch 13n has a depth that is, for example, 1% to 95% of the thickness of the tab 13.

The releasing paper 14 is a flat sheet. In the present embodiment, a surface of the releasing paper 14 on the water-proof sound-transmitting membrane 11 side is treated with a releasing treatment. At the time of attaching the water-proof sound-transmitting membrane 11 to an external housing, the water-proof sound-transmitting member 2 is separated from the releasing paper 14. The raw material of the tab 14 may be used as the raw material of the releasing paper 14.

As the first adhesive layer 21, the second adhesive layer 22 and the intermediate adhesive layer 25, there can be used adhesive tapes with an acrylic or silicone adhesive, for example. In the present embodiment, they have the same frame shape as that of the support layer 12.

Next, how to use the supported water-proof sound-transmitting member 1 of the present embodiment is described with reference to FIG. 3. First, the supported water-proof sound-transmitting member 1 described with reference to FIG. 1 is prepared (FIG. 3 (A)). Next, the overhanging portion 13*t* of the tab 13 in the supported water-proof sound-transmitting member 1 is pulled to a direction opposite to the releasing paper 14 to separate the water-proof sound-transmitting member 2 from the releasing paper 14 (FIG. 3 (B)). Subsequently, the water-proof sound-transmitting member 2 is attached to a housing 40 (FIG. 3 (C)). Then, the overhanging portion 13*t* of the tab 13 in the water-proof sound-transmitting member 2 is pulled to the side opposite to the housing 40 to separate the tab 13 from the water-proof sound-transmitting membrane 11 (FIG. 3 (D)). Thereby, the water-proof sound-transmitting membrane 11 is attached to the housing 40 (FIG. 3 (E)).

Figure 3:
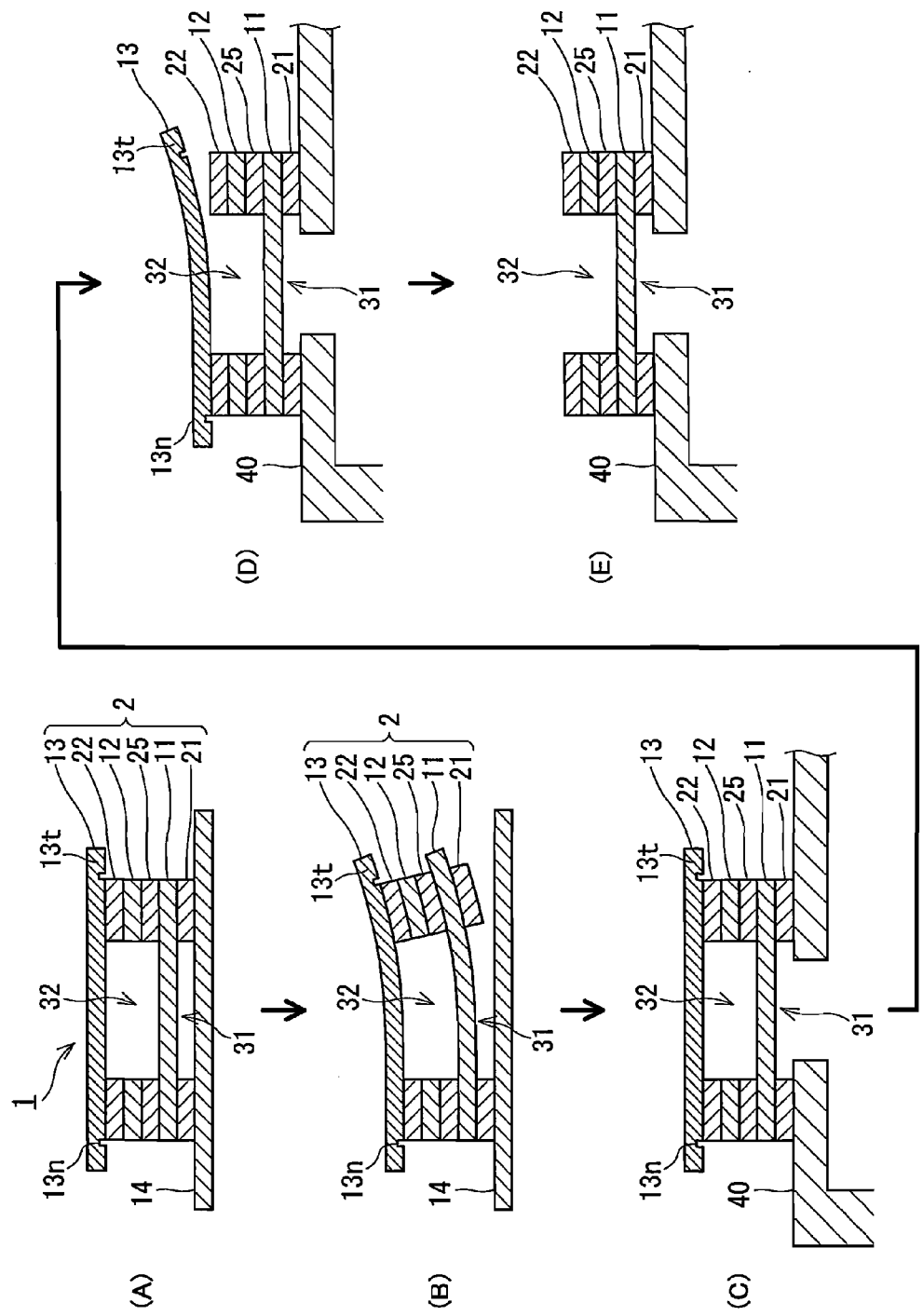
FIG. 3 is a diagram for explaining how to use the supported water-proof sound-transmitting member shown in FIG. 1. (A) to (E) show respectively scenes in using the supported water-proof sound-transmitting member.

In the present embodiment, the first adhesive layer 21 has a hollow shape so that the first space 31 is formed on one side of the water-proof sound-transmitting membrane 11, and the intermediate adhesive layer 25, the support layer 12 and the second adhesive layer 22 each have a hollow shape so that the second space 32 is formed on the other side of the water-proof sound-transmitting membrane 11 (FIG. 1 and FIG. 3 (A)). Thereby, as shown in FIG. 3 (E), when the water-proof sound-transmitting membrane 11 is attached to the housing 40, an internal space of the housing 40 is continuous with the first space 31 and the second space 32 is continuous with an external space, and the internal space of the housing 40 is partitioned off from the external space only with the water-proof sound-transmitting membrane 11 that blocks passage of a liquid while allowing passage of sound. That is, the present embodiment achieves a configuration in which the first adhesive layer 21, the intermediate adhesive layer 25, the support layer 12 and the second adhesive layer 22 each have a hollow shape so as to allow favorably the travel of sound between the internal space of the housing 40 and the external space while blocking the entry of a liquid from the external space to the internal space of the housing 40. However, they each do not necessarily have to have a hollow shape. By selecting the raw materials of these layers from raw materials that are unlikely to hinder the passage of sound, for example, it is possible to ensure favorable travel of sound between the internal space of the housing 40 and the external space without making the shape of each component hollow.

Hereinafter, the method for producing the supported water-proof sound-transmitting member of the present embodiment is described in detail with reference to FIG. 4.

Figure 4:
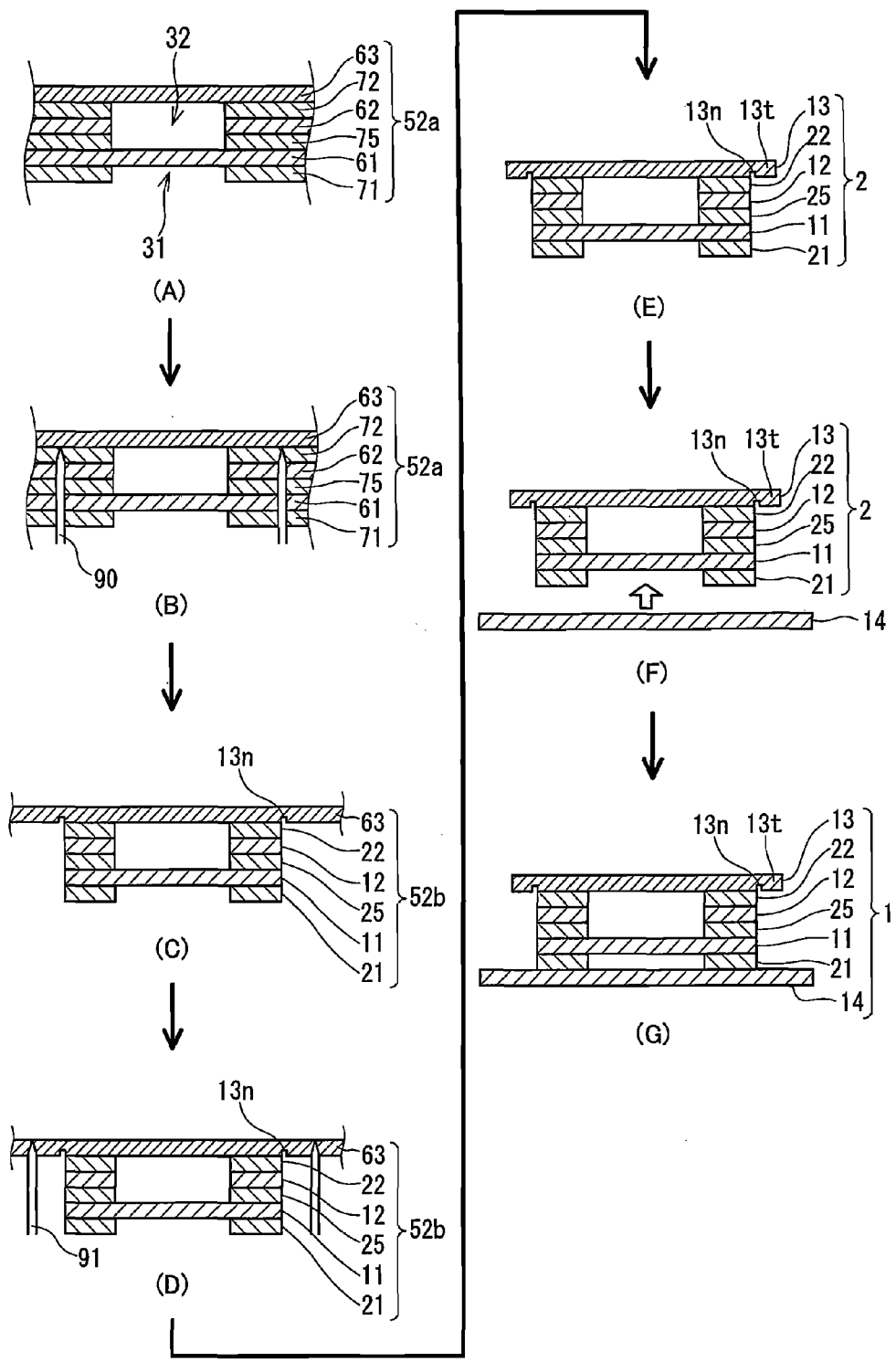
FIG. 4 is a diagram for explaining the method for producing the supported water-proof sound-transmitting member shown in FIG. 1. (A) to (G) show respectively scenes in the production process of the supported water-proof sound-transmitting member.

First, a first layer 71 with a hollow shape, a preliminary membrane body 61, an intermediate layer 75 with a hollow shape, a preliminary support layer body 62 with a hollow shape, a second layer 72 with a hollow shape, and a preliminary tab body 63 are laminated in this order to produce a laminate 52*a* (FIG. 4 (A)). The first adhesive layer 21, the water-proof sound-transmitting membrane 11, the intermediate adhesive layer 25, the support layer 12, the second adhesive layer 22, and the tab 13 can be cut out respectively from the first layer 71, the preliminary membrane body 61, the intermediate layer 75, the preliminary support layer body 62, the second layer 72, and the preliminary tab body 63.

Next, a blade 90 (a Thompson mold in the present embodiment) is inserted into the laminate 52*a* from the first layer 71 toward the preliminary tab body 63 (FIG. 4 (B)). Thereby, the first layer 71, the preliminary membrane body 61, the intermediate layer 75, the preliminary support layer body 62, and the second layer 72 are punched (cut) to form respectively the first adhesive layer 21, the water-proof sound-transmitting membrane 11, the intermediate adhesive layer 25, the support layer 12, and the second adhesive layer 22. Furthermore, the blade 90 is inserted to a specified depth in the preliminary tab body 63 to form the notch 13*n* in the preliminary tab body 63. Subsequently, an unnecessary portion is removed from the laminate 52*a* to obtain a laminate 52*b* (FIG. 4 (C)). As shown in FIG. 4 (C), the preliminary tab body 63 is provided with the notch 13*n* that is aligned with the end faces of the first adhesive layer 21, the water-proof sound-transmitting membrane 11, the intermediate adhesive layer 25, the support layer 12, and the second adhesive layer 22.

Next, the preliminary tab body 63 of the laminate 52*b* is cut with a blade 91 (a Thompson mold in the present embodiment) so that a portion overhanging beyond the water-proof sound-transmitting membrane 11 remains (FIG. 4 (D)). Thereby, the tab 13 with the overhanging portion 13*t* having, for example, a frame shape is formed to produce the water-proof sound-transmitting member 2 (FIG. 4 (E)).

Next, the releasing paper 14 is adhered to the water-proof sound-transmitting member 2 (FIG. 4 (F)). Thereby, the supported water-proof sound-transmitting member 1 is produced (FIG. 4 (G)).

In the production method of the present embodiment, the blade 90 is inserted into the laminate 52*a* as described above so that the first adhesive layer 21, the water-proof sound-transmitting membrane 11, the intermediate adhesive layer 25, the support layer 12, and the second adhesive layer 22 each having an end face with a specified shape are formed continuously with the preliminary tab body 63 having the notch 13*n*. Thereby, the supported water-proof sound-transmitting member 1 with the water-proof sound-transmitting member 2 that can be separated reliably from the releasing paper 14 is obtained.

The reason why the water-proof sound-transmitting member 2 can be separated reliably from the releasing paper 14 is as follows.

That is, no notch is formed in the tab in the case (a comparative embodiment) where a supported water-proof sound-transmitting member in which the same components as those constituting the supported water-proof sound-transmitting member 1 of the present embodiment are laminated in the same order is produced by firstly laminating the materials of the components of the supported water-proof sound-transmitting member other than the tab in the above-mentioned order on a releasing paper to fabricate a laminate, and subsequently punching the components of the laminate other than the releasing paper from the side opposite to the releasing paper toward the releasing paper with a blade and finally adhering the tab with a specified shape to the laminate.

In contrast, in the case where the supported water-proof sound-transmitting member 1 is produced by the production method of the present embodiment, the notch 13*n* is formed in the tab 13 (the preliminary tab body 63). Conceivably, in the production method of the present embodiment, the second layer 72 is pulled by the blade 90 at the time of forming the notch 13*n*, and thereby a part of the second adhesive layer 22 being formed is pressed into the notch 13*n*. That is, it is conceived that in the supported water-proof sound-transmitting member 1 produced by the production method of the present embodiment, the part of the second adhesive layer 22 pressed into the notch 13*n* also contributes to the bonding strength between the tab 13 and the water-proof sound-transmitting membrane 11 (more specifically, the bonding strength between the tab 13 and the support layer 12), and thus the bonding strength between the tab 13 and the water-proof sound-transmitting membrane 11 is higher than that in the comparative embodiment.

In the present embodiment, before the laminate 52*a* is fabricated, the first layer 71 is processed in advance so as to have a hollow shape. This allows the first space 31 to be formed after the laminate 52a is fabricated. Likewise, before the laminate 52a is fabricated, the preliminary support layer body 62, the intermediate layer 75, and the second layer 72 are processed in advance so that they each have a hollow shape, allowing the second space 32 to be formed after the laminate 52a is fabricated. However, another method may be used to form the first space 31 and the second space 32. For example, it is possible to fabricate a laminate having a shape similar to that of the laminate 52a by forming a laminate out of a solid material, punching off a part of the obtained laminate, and finally attaching a preliminary tab body to the laminate. When the raw materials composing the laminate are selected from raw materials that are unlikely to block passage of sound, for example, spaces corresponding respectively to the first space 31 and the second space 32 do not necessarily have to be formed in the laminate.

In the present embodiment, the overhanging portion 13t having a frame shape surrounding the water-proof sound-transmitting membrane 11 is formed by cutting the preliminary tab body 63 of the laminate 52b so that the portion overhanging beyond the water-proof sound-transmitting membrane 11 remains (so that the water-proof sound-transmitting membrane 11 does not project beyond a part of the tab 13). However, the preliminary tab body 63 may be cut so that the water-proof sound-transmitting membrane 11 projects beyond a part of the tab 13 to be formed. That is, the preliminary tab body 63 is cut so that the notch 13n remains in at least a part of the tab 13 and the overhanging portion 13t demarcated by the remaining notch 13n is formed.

In the present embodiment, the preliminary support layer body 62 is provided to the preliminary tab body 63 side when viewed from the preliminary membrane body 61. However, the preliminary support layer body 62 may be provided to the side opposite to the preliminary tab body 63 when viewed from the preliminary membrane body 61. The preliminary support layer body 62 may be omitted depending on the supported water-proof sound-transmitting member to be produced.

The edge of the blade 90 has, for example, a V shape (that may be a symmetrical V shape or an inclined V shape). This is also the case with the blade 91.

In the present embodiment, as shown in FIG. 4 (D), the blade 91 is inserted into the preliminary tab body 63 from a surface of the preliminary tab body 63 on the second adhesive layer 22 side toward a surface of the preliminary tab body 63 on the side opposite to the second adhesive layer 22 to process the preliminary tab body 63 into the tab 13. However, the blade 91 may be inserted into the preliminary tab body 63 from the surface of the preliminary tab body 63 on the side opposite to the second adhesive layer 22 toward the surface of the preliminary tab body 63 on the second adhesive layer 22 side to process the preliminary tab body 63 into the tab 13.

In the present embodiment, the supported water-proof sound-transmitting member 1 is produced by processing the preliminary tab body 63 of the laminate 52b into the tab 13 to produce the water-proof sound-transmitting member 2 and then adhering the releasing paper 14 to the water-proof sound-transmitting member 2. However, the supported water-proof sound-transmitting member 1 may be produced by adhering the releasing paper 14 to the laminate 52b and then processing the preliminary tab body 63 into the tab 13.

Figure 5:
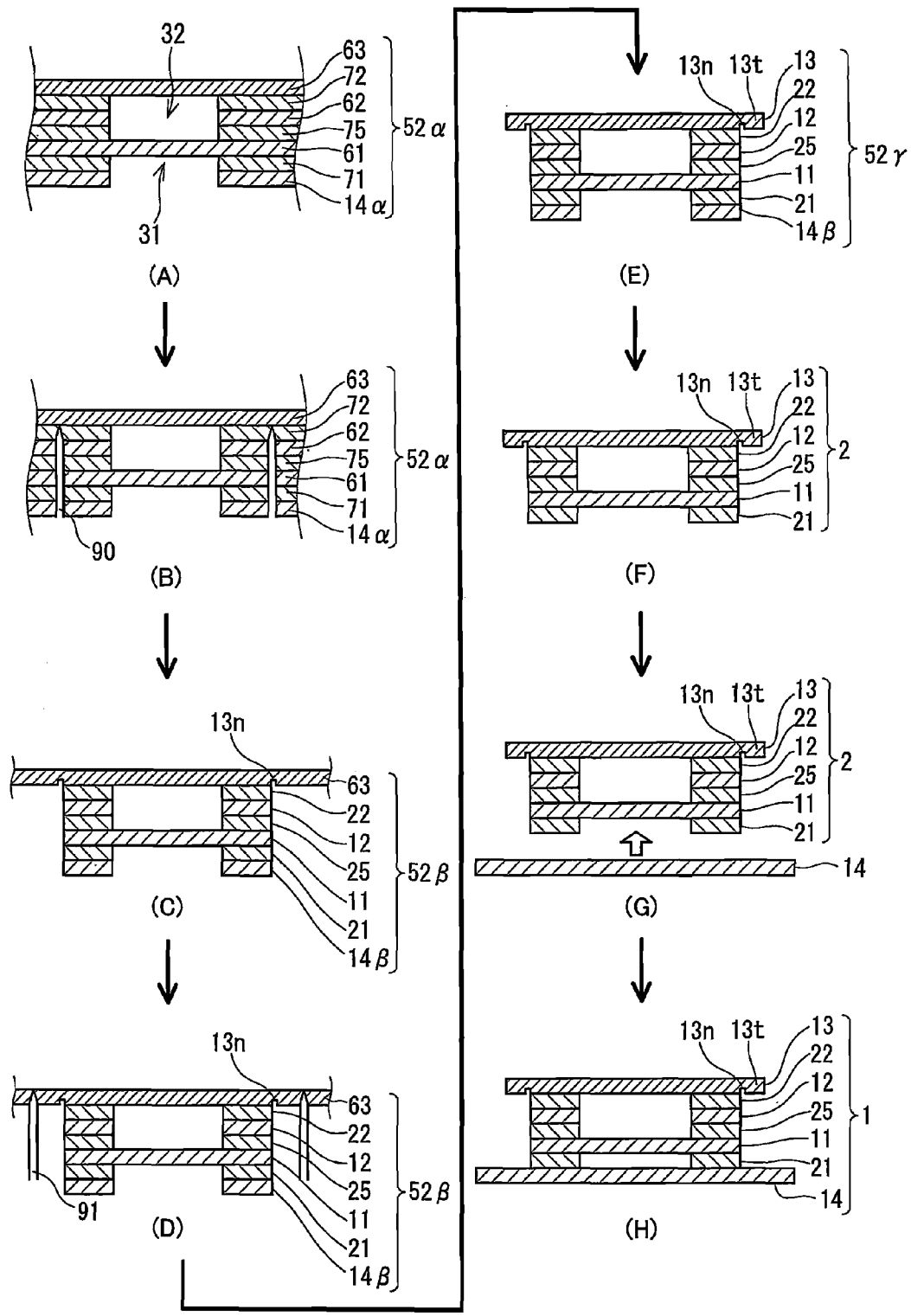
FIG. 5 is a diagram for explaining a modification of the method for producing the supported water-proof sound-transmitting member shown in FIG. 1. (A) to (H) show respectively scenes in the production process of the supported water-proof sound-transmitting member.

As shown in FIG. 5, instead of fabricating the laminate 52a of the present embodiment, a laminate 52α may be fabricated by laminating a releasing paper 14α similar to the releasing paper 14, the first layer 71, the preliminary membrane body 61, the intermediate layer 75, the preliminary support layer body 62, the second layer 72, and the preliminary tab body 63 in this order (FIG. 5 (A)). Also in fabricating the laminate 52α, by inserting the blade 90 into the laminate 52α (FIG. 5 (B)) in the same manner as in the present embodiment, it is possible to process the laminate 52α into a laminate 52β having a releasing paper 14β obtained by punching the releasing paper 14α, the first adhesive layer 21, the water-proof sound-transmitting membrane 11, the intermediate adhesive layer 25, the support layer 12, the second adhesive layer 22, and the preliminary tab body 63 (FIG. 5 (C)). Further, it is possible to process the laminate 52β into a laminate 52γ (FIG. 5 (E)) by processing the preliminary tab body 63 into the tab 13 with the blade 91 (FIG. 5 (D)). Thereafter, the releasing paper 14β is separated from the water-proof sound-transmitting membrane 11 to obtain the water-proof sound-transmitting member 2 (FIG. 5 (F)), and the releasing paper 14 is adhered to the water-proof sound-transmitting member 2 (FIG. 5 (G)) to produce the supported water-proof sound-transmitting member 1 (FIG. 5 (H)). When a supported water-proof sound-transmitting member is produced in this manner, main surfaces (largest surfaces) of the first layer 71 and the first adhesive layer 21 are not exposed during the time from when the laminate 52a is produced to when the releasing paper 14β is separated from the water-proof sound-transmitting membrane 11. Therefore, use of this production method makes it possible to reduce the possibility of foreign matters, such as dust, adhering to the first layer 71 and the first adhesive layer 21 during the production of the supported water-proof sound-transmitting member.

Examples

The supported water-proof sound-transmitting member shown in FIG. 1 was produced as Example. Specifically, a double-sided tape A (No. 5636, produced by Nitto Denko Corporation), a water-proof sound-transmitting membrane (NTF610AP, produced by Nitto Denko Corporation), a double-sided tape B (No. 5605, produced by Nitto Denko Corporation), a cushioning material (PORON SR-S-70P, produced by Rogers Inoac Corporation), a double-sided tape C (No. 5603, produced by Nitto Denko Corporation), and a tab (SS4 series A, produced by Nippa Corporation) were laminated in this order first to fabricate a laminate as shown in FIG. 4 (A). Subsequently, a blade was inserted into the fabricated laminate from the double-sided tape A toward the tab to cut the double-sided tape A, the water-proof sound-transmitting membrane, the double-sided tape B, the cushioning material, and the double-sided tape C into a specified shape, and a notch was formed in the tab. Thereby, a laminate as shown in FIG. 4 (C) was fabricated. Next, a blade was inserted into the tab of the fabricated laminate to cut the tab. Thereby, a water-proof sound-transmitting member including the tab having an overhanging portion as shown in FIG. 4 (E) was fabricated. Finally, a releasing paper (SS1 series A, produced by Nippa Corporation) was adhered to the fabricated water-proof sound-transmitting member. Thereby, a supported water-proof sound-transmitting member as shown in FIG. 4 (G) was produced. That is, in the present Example, a supported water-proof sound-transmitting member was produced according to the embodiment.

A supported water-proof sound-transmitting member in which the same materials as those in the Example were laminated in the same order was produced also in Comparative Example. However, in the Comparative Example, the releasing paper, the double-sided tape A, the water-proof sound-transmitting membrane, the double-sided tape B, the cushioning material, and the double-sided tape C were laminated to fabricate a laminate first and subsequently the components of the laminate other than the releasing paper were punched from the side opposite to the releasing paper toward the releasing paper, and finally a tab with a specified shape was adhered to the laminate (according to the comparative embodiment) to produce a supported water-proof sound-transmitting member.

In the supported water-proof sound-transmitting member of the Example, the water-proof sound-transmitting member was able to be separated easily from the releasing paper when the overhanging portion of the tab was pulled. Moreover, after the water-proof sound-transmitting member was adhered to a housing, the tab was able to be separated easily from the cushioning material when the overhanging portion of the tab was pulled.

In contrast, in the supported water-proof sound-transmitting member of the Comparative Example, when the overhanging portion of the tab was pulled, the water-proof sound-transmitting member failed to be separated from the releasing paper but the tab was separated from the water-proof sound-transmitting membrane.

INDUSTRIAL APPLICABILITY

The water-proof sound-transmitting member of the present invention can be used suitably in the case of attaching a water-proof sound-transmitting membrane to an electronic apparatus such as a cellular phone and a cordless telephone, and a digital camera.

The invention claimed is:

1. A method for producing a water-proof sound-transmitting member including a water-proof sound-transmitting membrane to be attached to a housing having a hole that allows sound to pass through the hole, and a tab that is provided to the water-proof sound-transmitting membrane and is to be separated after the water-proof sound-transmitting membrane is attached to the housing and that has an overhanging portion overhanging beyond the water-proof sound-transmitting membrane, the method comprising the steps of:

producing a laminate by laminating a first layer including a first adhesive layer for bonding the water-proof sound-transmitting membrane to the housing, a preliminary membrane body including the water-proof sound-transmitting membrane, a second layer including a second adhesive layer for adhering the tab to the water-proof sound-transmitting membrane, and a preliminary tab body including the tab in this order;

inserting a blade into the laminate from the first layer toward the preliminary tab body to cut the first layer, the preliminary membrane body and the second layer so as to form respectively the first adhesive layer, the water-proof sound-transmitting membrane and the second adhesive layer, and providing, in a surface of the preliminary tab body on a side of the second layer, a notch that is aligned with end faces of the first adhesive layer, the water-proof sound-transmitting membrane and the second adhesive layer; and cutting the preliminary tab body to form the tab.

2. A water-proof sound-transmitting member comprising:

a water-proof sound-transmitting membrane to be attached to a housing having a hole that allows sound to pass through the hole;

a first adhesive layer for bonding the water-proof sound-transmitting membrane to the housing, the first adhesive layer being provided to a side of one surface of the water-proof sound-transmitting membrane;

a second adhesive layer provided to a side of the other surface of the water-proof sound-transmitting membrane; and a tab that is provided on the second adhesive layer and is to be separated after the water-proof sound-transmitting membrane is attached to the housing and that has an overhanging portion overhanging beyond the water-proof sound-transmitting membrane, wherein a notch that is aligned with end faces of the first adhesive layer, the water-proof sound-transmitting membrane and the second adhesive layer is formed on a surface of the tab on a side of the second adhesive layer so as to demarcate the overhanging portion.

3. The water-proof sound-transmitting member according to claim 2, wherein the overhanging portion has an annular or frame shape surrounding the water-proof sound-transmitting membrane.

4. The water-proof sound-transmitting member according to claim 2, wherein the water-proof sound-transmitting membrane is composed of a fluororesin.

5. The water-proof sound-transmitting member according to claim 4, wherein the fluororesin is polytetrafluoroethylene.

6. A supported water-proof sound-transmitting member comprising:

the water-proof sound-transmitting member according to claim 2; and a releasing paper that is adhered to the water-proof sound-transmitting membrane via the first adhesive layer and that has a surface treated with a releasing treatment on a side of the water-proof sound-transmitting membrane.

* * * * *